(12) United States Patent
Castmo et al.

(10) Patent No.: US 11,323,950 B2
(45) Date of Patent: May 3, 2022

(54) FAULTY DEVICE LOAD PROTECTION (71) Applicant: Telefonaktiebolaget LM Ericsson (publ), Stockholm (SE)

(72) Inventors: Thomas Castmo, Västra Frölunda (SE); Peter Ramle, Mölnlycke (SE); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/344,999

(22) PCT Filed: Oct. 31, 2017

(86) PCT No.: PCT/EP2017/077884
§ 371 (c)(1),
(2) Date: Apr. 25, 2019

(87) PCT Pub. No.: WO2018/086963
PCT Pub. Date: May 17, 2018

(65) Prior Publication Data
US 2019/0274089 A1 Sep. 5, 2019

Related U.S. Application Data (60) Provisional application No. 62/419,108, filed on Nov. 8, 2016.

(51) Int. Cl.
*H04W 48/06* (2009.01)
*H04L 12/927* (2013.01)
(Continued)

(52) U.S. Cl.
CPC ......... *H04W 48/06* (2013.01); *H04L 43/0847* (2013.01); *H04L 47/808* (2013.01);
(Continued)

(58) Field of Classification Search
CPC .................... H04W 28/0284; H04W 76/18
See application file for complete search history.

(56) References Cited

U.S. PATENT DOCUMENTS 9,088,926 B2 7/2015 Liu et al.
10,631,356 B2* 4/2020 Ianev .................... H04W 40/04
(Continued)

FOREIGN PATENT DOCUMENTS

JP 2014078987 A 5/2014
RU 2013125769 A 12/2014
WO 2016116174 A1 7/2016

OTHER PUBLICATIONS

Huawei et al., "Enhancement for MME Overload Control", 3GPP TSG-RAN3 Meeting #94, Reno, Nevada, USA, Nov. 14, 2016, pp. 1-3, R3-162879, 3GPP.
(Continued)

*Primary Examiner* — Raj Jain
(74) *Attorney, Agent, or Firm* — Coats & Bennett, PLLC (57) ABSTRACT

A mobile management control entity, MBC, being adapted for communicating with an access node, AN, such as an eNodeB, the MB being adapted for issuing a message comprising an indication (7) of a type of traffic to be reduced to or from the AN, wherein the traffic reduction comprises one of rejecting, ignoring or selectively restricting traffic. An Access Node, AN the AN being adapted for receiving (7) from the MBC an indication (7) of a type of traffic to be reduced, receiving (210, 150) a message (150) of a UE associated with the indication of a type of traffic to be reduced, rejecting, ignoring or selectively restricting (212) traffic to or from the UE belonging to the indication of type of traffic to be reduced.

20 Claims, 9 Drawing Sheets (51) Int. Cl.
    *H04W 8/26* (2009.01)
    *H04W 28/02* (2009.01)
    *H04W 28/08* (2009.01)
    *H04W 48/02* (2009.01)
    *H04L 12/26* (2006.01)
    *H04W 84/04* (2009.01)
    *H04L 47/80* (2022.01)
    *H04L 43/0823* (2022.01)

(52) U.S. Cl.
    CPC ......... *H04W 8/26* (2013.01); *H04W 28/0284* (2013.01); *H04W 28/0289* (2013.01); *H04W 28/08* (2013.01); *H04W 48/02* (2013.01); *H04W 84/042* (2013.01)

(56) References Cited

U.S. PATENT DOCUMENTS

| | | | |
|---|---|---|---|
| 2012/0155257 A1 | 6/2012 | Tiwari | |
| 2013/0215742 A1* | 8/2013 | Sirotkin | H04W 28/0247 370/230 |
| 2014/0313889 A1* | 10/2014 | Jeong | H04W 28/0284 370/230 |
| 2015/0055459 A1* | 2/2015 | Wong | H04W 28/0284 370/230 |
| 2016/0366607 A1* | 12/2016 | Zhang | H04W 28/08 |
| 2017/0013477 A1* | 1/2017 | Yamada | H04L 47/25 |
| 2018/0212710 A1* | 7/2018 | Ronneke | H04W 28/02 |
| 2019/0274089 A1* | 9/2019 | Castmo | H04W 48/02 |

OTHER PUBLICATIONS

Ericsson, "Hard Blocking of Misbehaving CIoT Devices", SA WG2 Meeting #118, Reno, Nevada, USA, Nov. 14, 2016, pp. 1-4, S2-166729, 3GPP.

QUALCOMM Incorporated, "Revisiting MME Overload Issues", 3GPP TSG-RAN WG3#89bis, Sophia Antipolis, France, Oct. 5, 2015, pp. 1-3, R3-152199, 3GPP.

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 14)", Technical Specification, 3GPP TS 36.413 V14.0.0, Sep. 1, 2016, pp. 1-333, 3GPP.

ETSI, "LTE; Evolved Universal Terrestrial Radio Access Network (E-UTRAN); S1 Application Protocol (S1AP) (3GPP TS 36.413 V13.3.0 Release 13)", Technical Specification, ETSI TS 136 413 V13.3.0, Aug. 1, 2016, pp. 1-499, ETSI.

3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 14)", Technical Specification, 3GPP TS 23.401 V14.1.0, Sep. 1, 2016, pp. 1-379, 3GPP.

* cited by examiner

FIG. 4 – MBC

FIG. 7 – MBC

FAULTY DEVICE LOAD PROTECTION

This invention is directed to protection methods and apparatus involving handling a large plurality of terminals and in particular methods and apparatuses for a plurality of faulty Internet of Things, IoT, devices.

BACKGROUND

Figure 1:
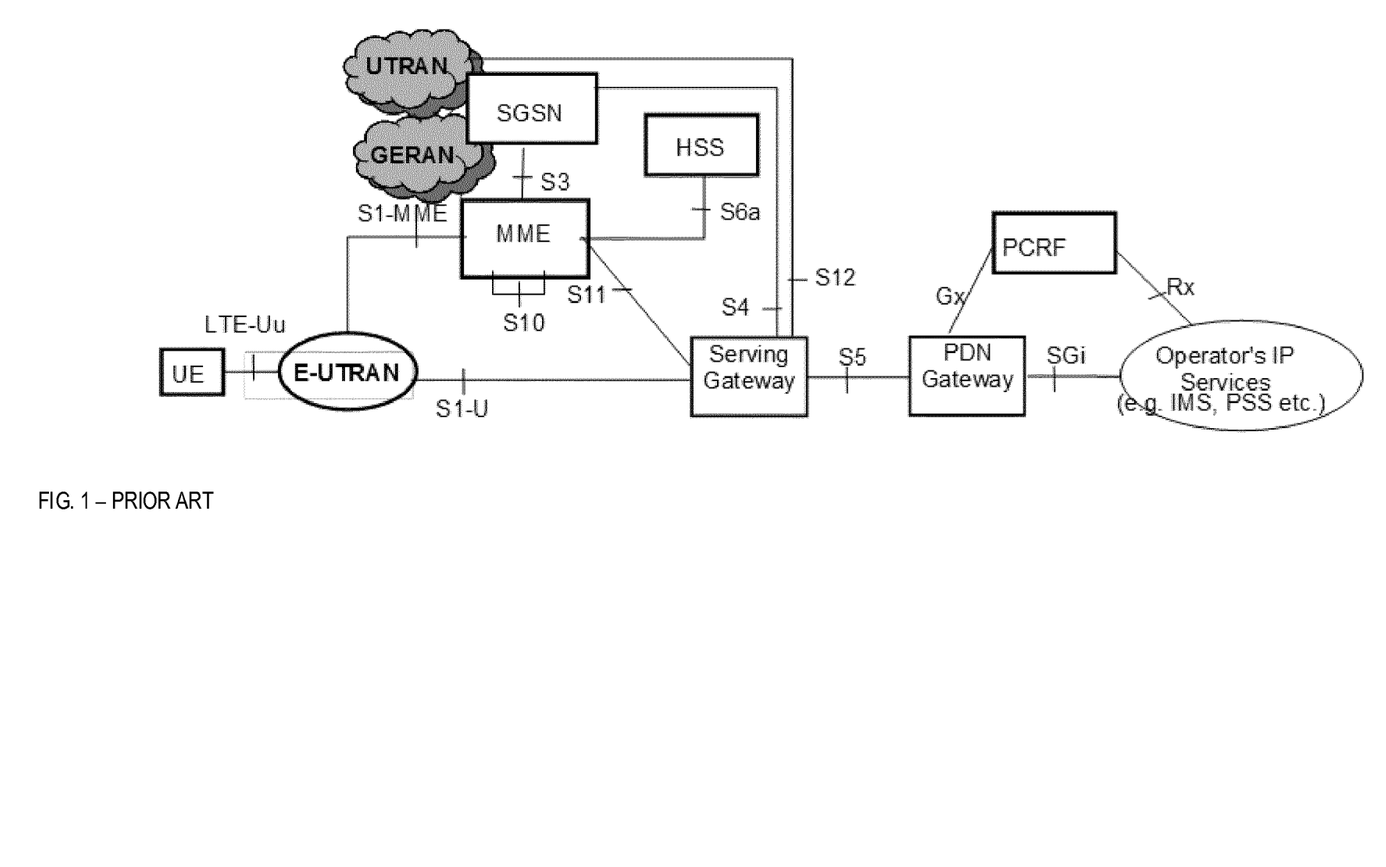
FIG. 1 shows a known reference Evolved Packet System, EPS, Core Network, CN, architecture showing moreover a UE, eNodeB, MME and SGW.
Figure 2:
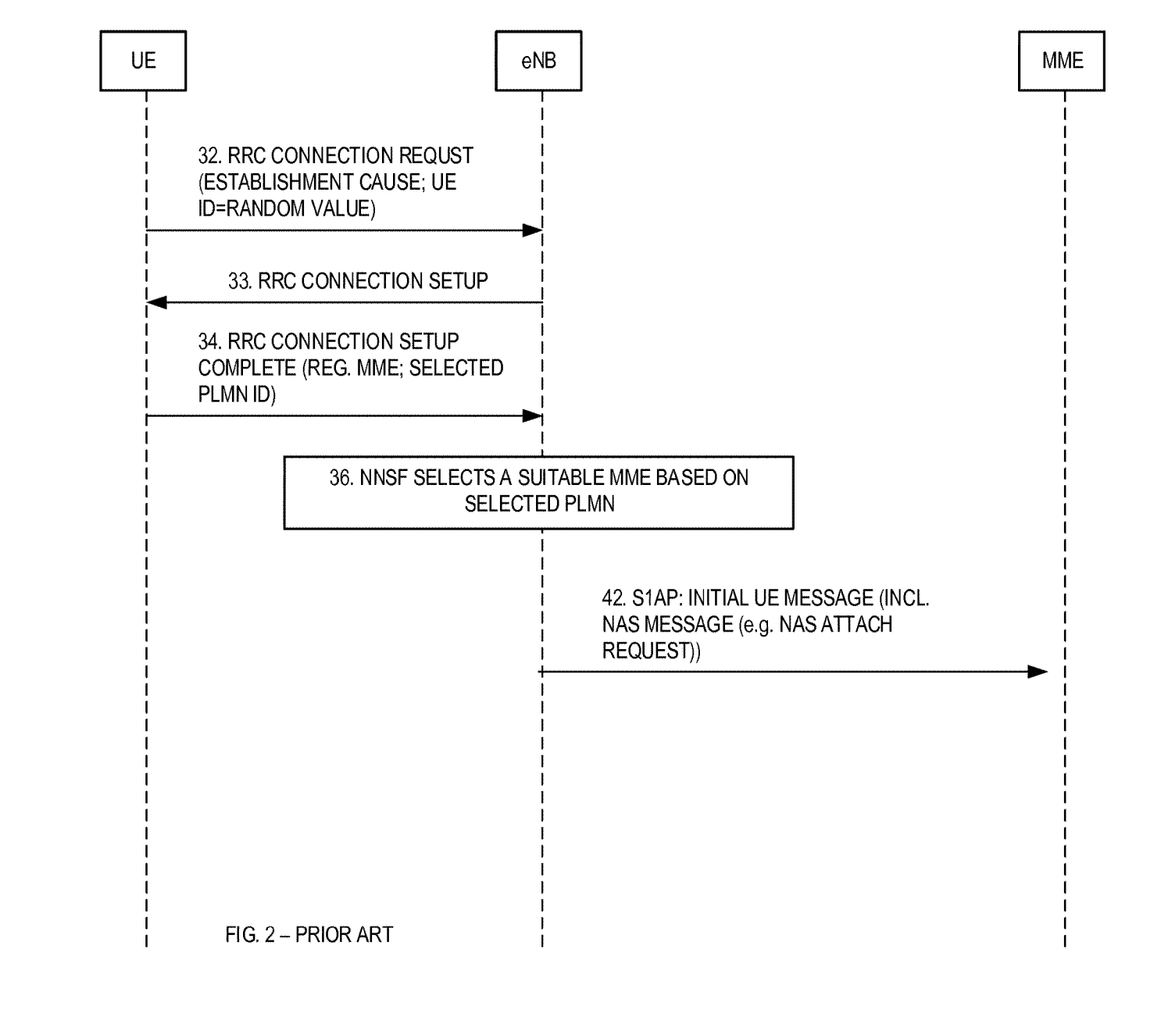
FIG. 2 shows an exemplary signalling flow according to a prior art scenario involving a Radio Resource Control, RRC, connection set-up and MME selection.

3GPP TS 23.401 v 14.1.0 (2016-09) describes General Packet Radio Service (GPRS) enhancements for Evolved Universal Terrestrial Radio Access Network (E-UTRAN) access. In FIG. 4.2.1-1 of 3GPPT TS 23.401 v 14.1.0, a non-roaming architecture is shown in which a UE is connected to the E-UTRAN also denoted eNodeB. S1-U is the reference point between E-UTRAN and Serving GW for the per bearer user plane tunnelling and inter eNodeB path switching during handover. S1-MME is the reference point for the control plane protocol between E-UTRAN and MME. This figure has been reproduced in FIG. 1 of the present application.

3GPP TS 36.413 version 13.3.0 Release 13 (ETSI TS 136 413 V13.3.0 (2016-08)) specifies the E-UTRAN radio network layer signalling protocol for the S1 interface, hence the interface between E-UTRAN and SGW and MME. S1AP consists of Elementary Procedures (EPs). An Elementary Procedure is a unit of interaction between eNBs and the EPC.

When deploying IoT there is a considerable risk that some IoT devices will act in a manner which can be characterized as misbehaving. A misbehaving behaviour may be due to the IoT device itself and be caused by various hardware components or certain applications running on the IoT device or due to a specific inappropriate use of the IoT device. The misbehaving may be inadvertent or faulty. Alternatively, it may be enacted in a wilful manner for causing harm, deception or sabotage or other kinds of inappropriate effects.

For example, a poor realization of the application that executes on the device may lead to an erroneous and inappropriate behaviour. For example, devices belonging to companies that have gone out of business may repeatedly try to get access to network resources that is unwarranted.

A misbehaving IoT device would typically only consume a small amount of network resources. However, since potentially a high number of IoT devices will be deployed, the overall network utilization for all faulty devices may be significant and lead to large amounts of wasted resources, both in the radio network and in the core network.

The entry barrier for launching IoT applications will decrease significantly and as more application vendors will introduce applications there will be a great risk that some of these applications are launched on devices with flaws when it comes to signalling. Erroneous signalling may occur due to mistakes and unwanted signalling may also occur deliberately by rogue individuals taking advantage or errors and breaches in security systems.

SUMMARY

It is noted that devices that repeatedly try to access a network to which no access is eventually granted will consume unnecessary resources. According to the invention it is found that the sooner a network can detect that given unauthorized devices shall be refused access, the less resources are wasted.

It is first object of the invention to save resources in a network in situations with misbehaving or erroneous devices.

This object is obtained by a method for a mobile management control entity, MBC, being adapted for communicating with an access node, AN, such as an eNodeB, the MB being adapted for, —issuing a message comprising an indication of a type of traffic to be reduced to or from the AN. The traffic reduction comprises one of blocking, rejecting, ignoring or selectively restricting traffic.

The above object has furthermore been achieved by a method for an access node, AN, such as eNodeB, eNB, the AN being adapted for radio access to UE's the AN communicating with a mobility control entity, MBC such as a Mobility Management Entity, MME, the method comprising—receiving from the MBC a message with an indication of a type of traffic to be reduced from the MBC; and —receiving a message indicating a UE associated with the indication of a type of traffic to be reduced. The method moreover comprises—blocking, rejecting, ignoring or selectively restricting traffic to or from the UE belonging to the indication of type of traffic to be reduced.

According to one aspect there is provided a mobile management control entity, MBC, being adapted for communicating with an access node, AN, such as an eNodeB, the MBC comprising processing means being adapted for,
    issuing a message comprising an indication of a type of traffic to be reduced to or from the AN, wherein the traffic reduction comprises one of blocking, rejecting, ignoring or selectively restricting traffic.

According to a further embodiment there is provided an access node, AN, such as eNodeB, eNB, the AN comprising processing means being adapted for radio access to UE's the AN communicating with a mobility control entity, MBC, the AN being adapted for
    receiving from the MBC a message with an indication of a type of traffic to be reduced,
    receiving a further message indicating a UE associated with the indication of a type of traffic to be reduced from the MBC,
    blocking, rejecting, ignoring or selectively restricting traffic to or from the UE belonging to the indication of type of traffic to be reduced.

In current evolved packet core, EPC, systems involving eNodeB and MME, there is no good way to detect misbehaving/faulty devices until they reach the MME, i.e. a radio connection has been established and signalling is done between the MME and the eNodeB. 3GPP 23.401 v14.1.0, 4.3.7.4—MME control of overload—specifies functions to handle congestion and signalling (over)load; however, this method requires signalling all the way up to the MME.

According to another aspect of the invention, the indication (7) of type of traffic to be reduced is comprised in an overload message (6) that indicates a started overload situation, or overload situation that is risking to start, to the AN.

The overload message (6) may comprises an erroneous traffic indication.

According to a further aspect of the invention, the indication (7) of a type of traffic to be reduced is associated with a reserved identity space to which UEs may be assigned.

According to one further aspect, the MB is a Mobility Management Entity, MME, the access node, AN, is an eNodeB, and wherein the reserved identity space is a Globally Unique Mobile Management Entity Identifier, GUMMEI, list information element comprising a list of MME Code, MMEC, identities reserved for being assigned to UE's being subject to traffic reduction.

According to one aspect of the invention, a misbehaving device could be refused access already during a radio connection setup process whereby the wasted resource utilization could be kept to a minimum.

By informing radio network about identities of misbehaving devices the radio base stations can take appropriate actions such as refusing/ignoring affected devices with minimum network effort. By early (i.e. by the RAN) detection of devices that should have no chance of getting access to network services the overall network load from such devices can be kept to a bare minimum making non-misbehaving devices experience better service with less capital expenditure.

DETAILED DESCRIPTION

In one embodiment of the invention, a Mobility Management Control entity, MBC, such as a MME, provides identities that allow an Access Node, AN, such as an eNodeB, to discard the message as early as possible. The access node, AN, handles the message in a variety of ways, e.g. the AN can actively reject the UE with some wait timer that does not allow the UE to retry until the timer expires or the AN can passively ignore the UE and deallocate its resources once the temporary identity is revealed.

Figure 3:
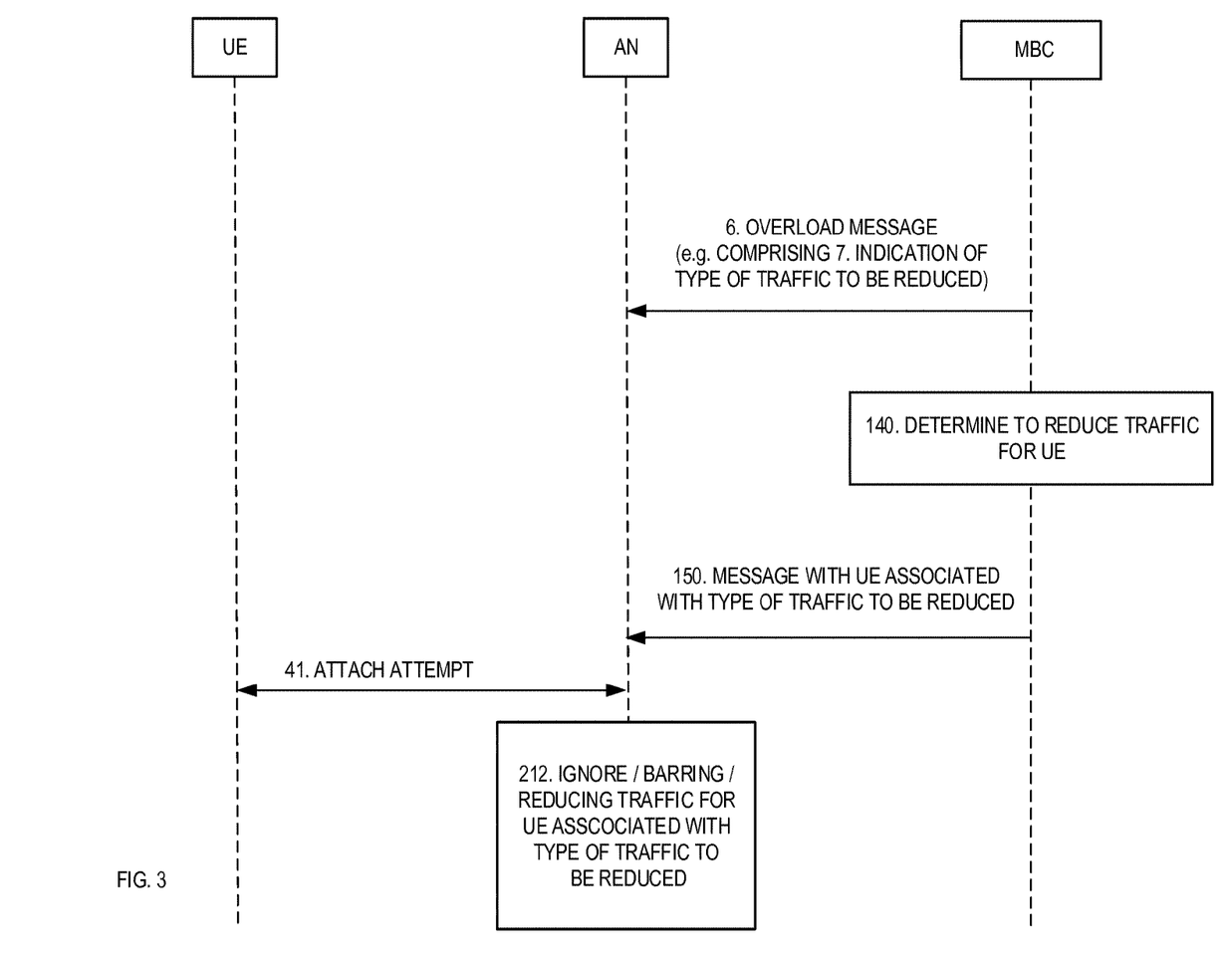
FIG. 3 is a signalling diagram relating to a first embodiment of the invention.
Figure 4:
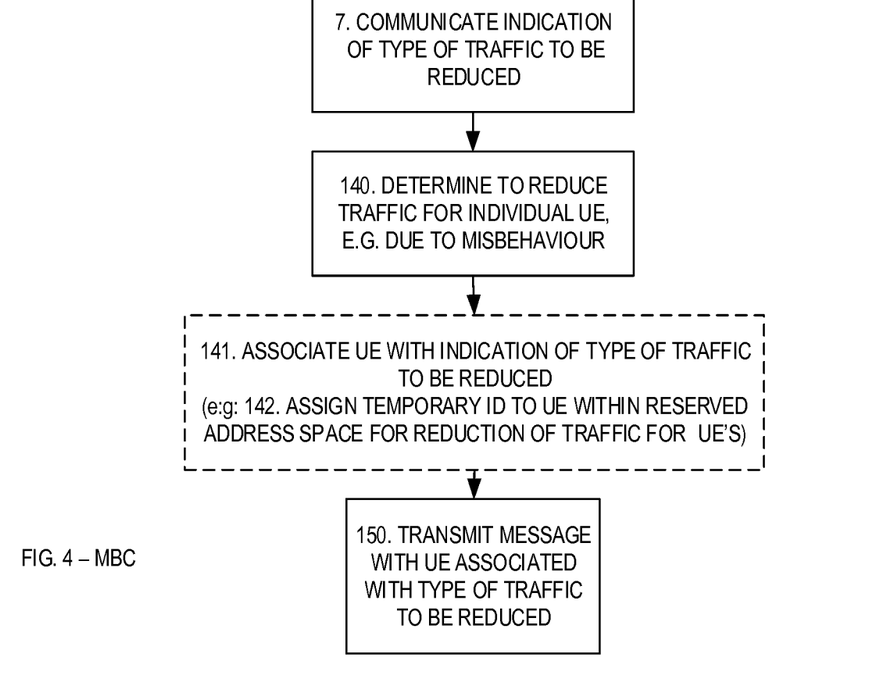
FIG. 4 and FIG. 5 are flow diagrams relating to an access node AN and a Mobility Management Control entity, MBC according to a first embodiment.
Figure 5:
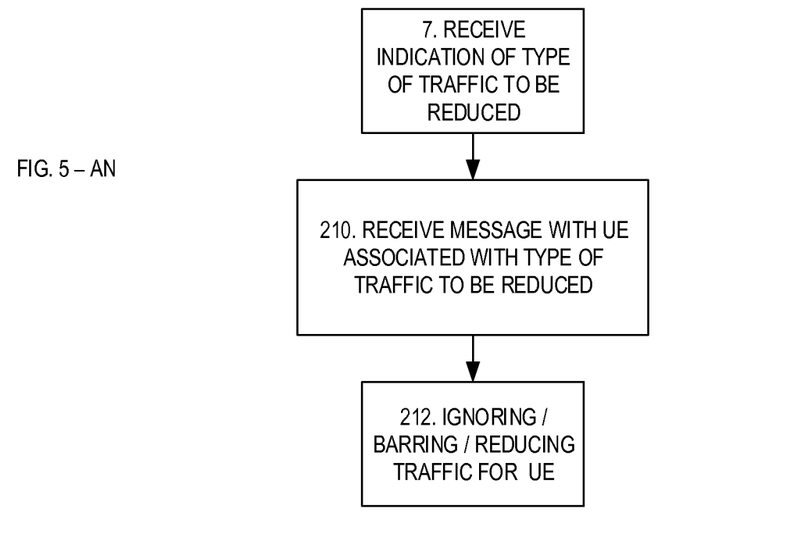

In FIGS. 3, 4 and 5, a first embodiment of the invention is shown.

In step 6, an overload message is transmitted from the MBC to the AN. This message may comprise an indication 7 of a type of traffic to be reduced that marks traffic to be reduced, blocked or limited or subject to other restrictions imposed by the AN. The AN is made aware of this indication 7.

In step 140, it is determined in the MBC to reduce traffic for a particular UE, for instance because the particular UE is found to be misbehaving.

The MBC transmits a message 150 with a UE associated with an indication of a type of traffic to be reduced.

The AN, when encountering an attach attempt 41 from the particular UE, notes that the UE in question is associated with the type of traffic to be reduced and decides to ignore/bar/or reduce traffic for that particular UE.

The overload message 6 may be specified in a manner explained further below.

In one option of this embodiment, after step 140—determine to reduce traffic for a given UE—step 141 is carried out: The MBC associates the UE with an indication of a type of traffic to be reduced by assigning 142 a temporary ID to the UE within a reserved address space for that purpose namely so as to effectuate a reduction of traffic for that particular UE and also other UE's associated within the reserved address space.

According to aspects of the invention it is provided that whenever a MME detects that a UE is repeatedly trying to access the network without grant, the MME assigns a temporal identity (such as Globally Unique Temporary Identifier, GUTI) to the UE with a pattern that subsequently will enable it to be detected by an eNodeB as a faulty device. The eNodeB may then take appropriate actions such as ignoring or rejecting the device on radio level in an initial stage before any further signalling and/or processing has taken place.

Figure 6:
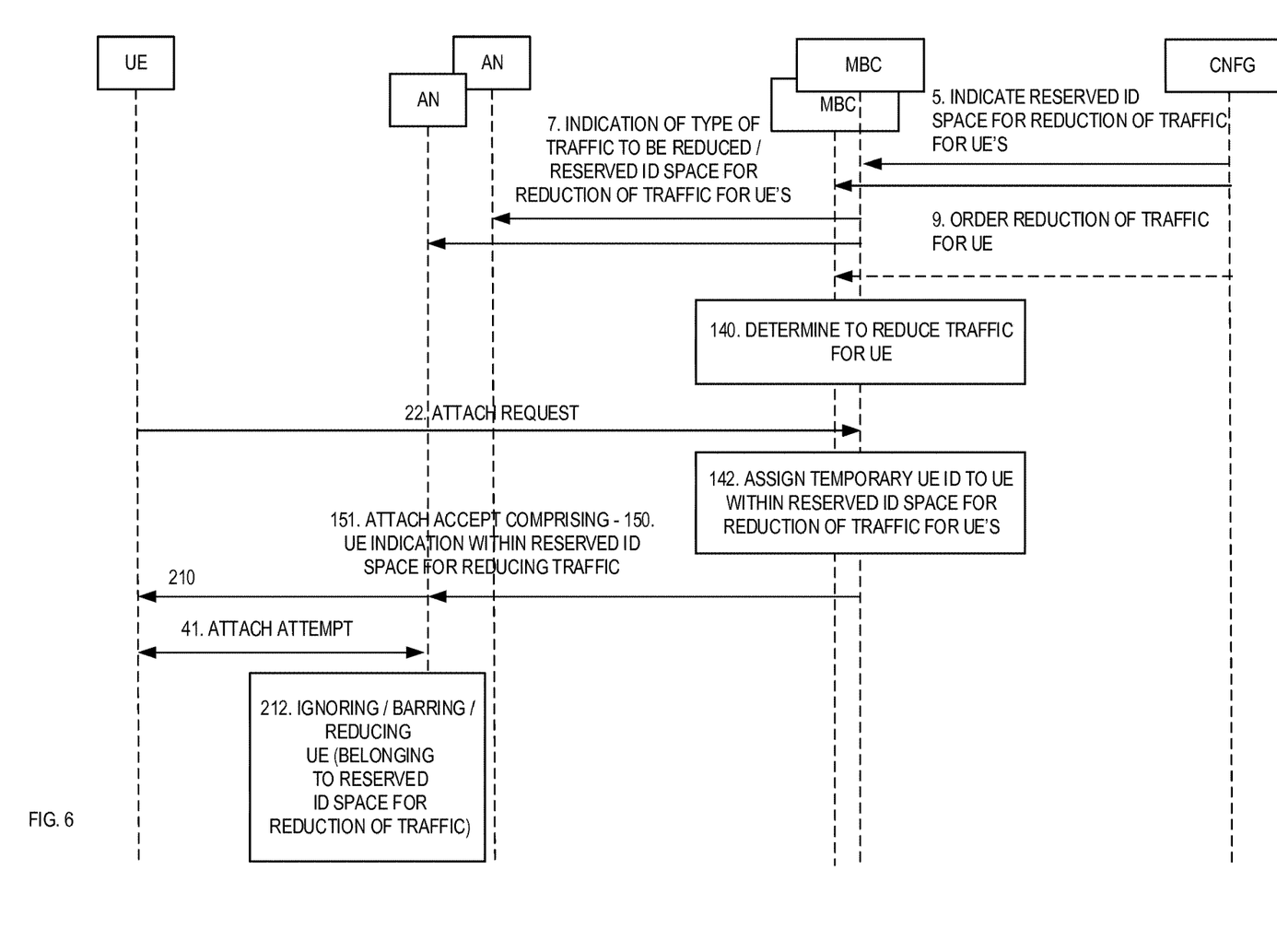
FIG. 6 shows a sequence diagram of a further embodiment of the invention.

In a further embodiment shown in FIG. 6—now relating to an exemplary scenario with multiple AN's and multiple MBC's and a configuration server, CNFG—an indication of a reserved ID space for reduction of traffic for UE's/identities reserved for being assigned to UE's being subject to traffic reduction are communicated in step 5 to a number of MBC's. The MBC's in turn transmits this information 7 further to the plurality of AN's.

A MBC may subsequently decide to reduce traffic for a particular UE because of actions which indicates a rogue or misbehaving behaviour, 140. Alternatively, this knowledge may also be transferred as an order or instruction to the MBC, 9 from the CNFG.

When encountering an e.g. attach request 22 from the particular misbehaving UE, in step 142 the MBC assigns a temporary UE identity, ID, to the particular UE within the reserved ID space for reduction of traffic for UE's. Subsequently, the MBC responds with an Attach Accept 151 comprising a UE indication within the reserved ID space for reducing traffic 150 to the AN, which AN forwards 210 the message to the UE.

When the particular UE makes a renewed Attach attempts 41, such attempts are not forwarded to the MBC—or any other CN node—because the AN ignores or performs any of the actions of reducing traffic explained above, 212.

Figure 7:
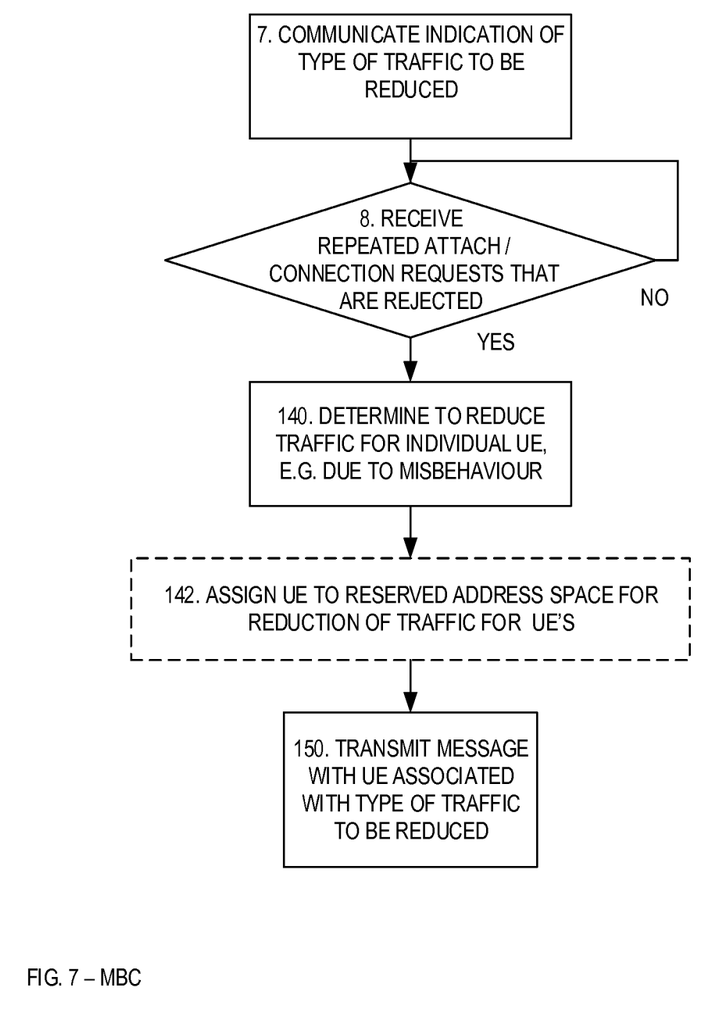
FIG. 7 shows an alternative flow diagram for an MBC.

In FIG. 7, a further variant of the MBC functionality indicated in FIG. 4 is provided. In this embodiment it is examined in step 8 whether repeated Attach Requests, e.g. within a certain time period or timer value, over a predetermined limit, are encountered. The procedure first proceeds to step 140, when this is the case.

To create a fall-back solution, in case of reconsidering the status of a UE and deciding not to treat it as misbehaving any more, the eNB is in one embodiment provided with the complete identity (GUTI) of the UE thereby creating an exception to the set of misbehaving UEs. Once letting the UE signalling propagate to the CN, the GUTI that is stored in the eNB may be removed as the MME will assign to the UE another GUTI not identifying the UE as misbehaving.

Another way of cancelling what are considered misbehaving UE's could be to provide the eNB with a new group identifier of misbehaving UEs. However, one implication of such a solution is that all UEs previously considered as misbehaving will be forwarded to the MME whereby MME need to reassign the new group identifier to those UEs still being regarded as misbehaving.

A UE that has undergone maintenance, and thus should not be regarded as misbehaving any longer, may get access to the network by IMSI Attach.

In one embodiment, since GUTI allocation is assigned only in the Attach/TAU accept message, the MME has to send an accept to the UE. After this, the UE is immediately released by the MME to minimize the chance of further signalling/data transfer. When the UE tries to access the network from this point it is recognized as faulty by the RAN node and is not let through further.

According to one embodiment, the Global Universal Temporary Identifier, GUTI, is used for indicating to the AN that a given UE or group of UE's should be barred.

The existing Globally Unique Temporary Identifier, GUTI, identifies the UE globally without revealing the subscriber identity (i.e. the International Mobile Subscriber Identity that identifies the SIM or USIM) and is based on the following format:

| GUTI | | | |
| --- | --- | --- | --- |
| GUMMEI | | | M-TMSI (32 BIT) |
| PLMN ID | MMEGI (16 BIT) | MMEC (8 BIT) | |

The Globally Unique Temporary Identifier, GUTI, comprises a Globally Unique Mobile Management Entity Identifier, GUMMEI and a MME-Temporary Mobile Subscriber Identity, M-TMSI.

The GUMMEI again consists of a Public Land Mobile Network Identity, PLMN ID, a MME Group identity, MMEGI, and a MME Code, MMEC. The PLMN again consists of a Mobile Country Code, MCC, and a Mobile Network Code, MNC.

MME's are typically arranged in pools designated by the MMEGI. According to an embodiment of the invention, since practically no employment would incorporate an amount of MME's in a pool corresponding to the upper limit given by the 8 bit MMEC address space, a "non-existent" or "non-appearing" MMEC is chosen as a reserved identification space for UE's to be barred/type of traffic to be reduced.

When it is determined according to embodiments of the invention that a given UE should be barred, for instance due to faulty behaviour or misbehaviour, the UE in question is allocated a GUTI in which the MMEC is chosen from an address space containing the reserved MMEC for traffic reduction.

To sum up, the following is provided according to some embodiments of the invention:

Method for a mobile management control entity, MBC, being adapted for communicating with an access node, AN, such as an eNodeB, the MB being adapted for, issuing a message comprising an indication 7 of a type of traffic to be reduced to or from the AN, wherein the traffic reduction comprises one of rejecting, ignoring or selectively restricting traffic.

The indication 7 of type of traffic to be reduced may be comprised in an overload message 6 that indicates a started overload situation, or overload situation that is risking to start, to the AN.

The overload message 6 may comprise an erroneous traffic indication.

The indication 7 of a type of traffic to be reduced may be associated with a reserved identity space to which UEs may be assigned.

In one embodiment, the MB is a Mobility Management Entity, MME, the access node, AN, is an eNodeB, and wherein the reserved identity space is a Globally Unique Mobile Management Entity Identifier, GUMMEI, list information element comprising a list of MME Code, MMEC, identities reserved for being assigned to UE's being subject to traffic reduction.

The list of MMEC identities may be chosen so as not to correspond to any MME's being used at a given time in a Public Land Mobile Network, PLMN, for the reserved ID space The MBC after having issued the indication 7 of indication of type of traffic to be reduced, may be performing a determination 140 as to reduce traffic for a UE, such as for a particular UE that is misbehaving;

assigning 142 the UE to the reserved identity space associated with the type of traffic to be reduced, transmitting a further message 150 with the assigned UE to the AN.

The further message 150 may be an attach accept message 151. The further message (150) may also be a TAU accept message or GUTI reallocation command.

There is also provided a method for an access node, AN, such as eNodeB, eNB, the AN being adapted for radio access to UE's the AN communicating with a mobility control entity, MBC/MME, the method comprising receiving 7 from the MB an indication 7 of a type of traffic to be reduced, receiving 210, 150 a message 150 of a UE associated with the indication of a type of traffic to be reduced, rejecting, ignoring or selectively restricting 212 traffic to or from the UE belonging to the indication of type of traffic to be reduced.

Embodiments may advantageously be implemented by means of a computer program or computer program product.

There is further provided a mobile management control entity, MBC, being adapted for communicating with an access node, AN, such as an eNodeB, the MBC comprising processing means being adapted for, issuing a message comprising an indication 7 of a type of traffic to be reduced to or from the AN, wherein the traffic reduction comprises one of rejecting, ignoring or selectively restricting traffic.

Also, an Access node, AN, such as eNodeB, eNB, is provided. The AN comprises processing means being adapted for providing radio access to UE's the AN communicating with a mobility control entity, MBC, the AN being adapted for receiving 7 from the MBC an indication 7 of a type of traffic to be reduced, receiving 210, 150 a message 150 of a UE associated with the indication of a type of traffic to be reduced, rejecting, ignoring or selectively restricting 212 traffic to or from the UE belonging to the indication of type of traffic to be reduced.

Further Embodiments

One aspect of the invention may relate to implementations according to 3 GPP TS 23.401 v. 14.1.0 and 3GPP TS36.413 v. 14.0.0.

The existing 3 GPP TS 23.401 v. 14.1.0 specification 4.3.7.4 specifies that he MME shall contain mechanisms for avoiding and handling overload situations. These can include the use of NAS signalling to reject NAS requests from UEs. In addition, under unusual circumstances, the MME shall restrict the load that its eNodeB's are generating if it is configured to enable the overload restriction. This can be achieved by the MME invoking the S1 interface overload procedure (see TS 36.300 and TS 36.413 to all or to a proportion of the eNodeB's with which the MME has S1 interface connections. To reflect the amount of load that the MME wishes to reduce, the MME can adjust the proportion of eNodeB's which are sent S1 interface OVERLOAD START message, and the content of the OVERLOAD START message. The MME may optionally either include a Traffic Load Reduction Indication in the OVERLOAD START message.

Figure 8:
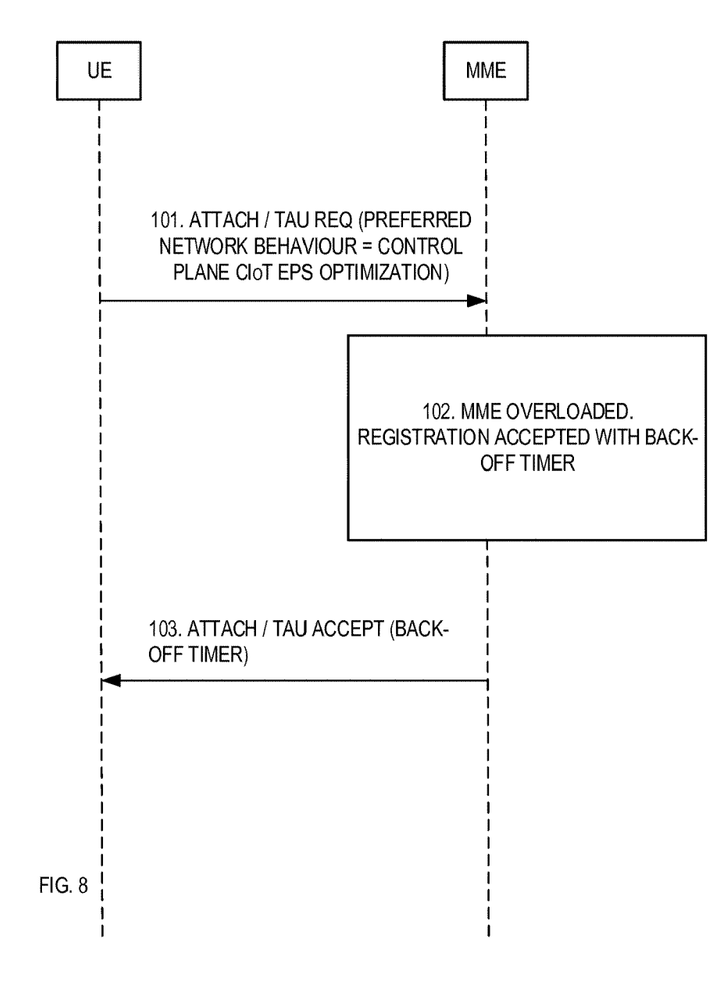
FIGS. 8 and 9 shows further embodiments for CIoT scenarios.

In the latter specification 3GPP TS36.413 v. 14.0.0 in section 8.7.6 an overload start procedure is indicated whose purpose is to inform an eNB to reduce the signalling load towards the concerned MME. In FIG. 8.7.6.2-1: Overload Start procedure, the Overload Start message is issued by the MME to the eNB.

According to one aspect of the invention, 3GPP TS 23.401 v. 14.1.0 is modified so the MME may optionally either include a Traffic Load Reduction Indication or an Erroneous Traffic Indication in the OVERLOAD START message. In case the Traffic Load Reduction Indication is included, the eNodeB shall, if supported, reduce the type of traffic indicated according the requested percentage (3GPP TS 36.413). And in case the Erroneous Traffic Indication is included, the eNodeB shall, if supported, reduce the type of traffic indicated (3GPP TS 36.413). The way of reducing the traffic indicated is implementation dependent e.g. by rejecting or ignoring messages.

According to one aspect of the present invention, a new Information Element, IE, is introduced in the OVERLOAD START message to indicate to the eNB that the identified traffic should be reduced.

According to one aspect of the invention, the 3GPP TS36.413 v. 14.0.0 procedure is moreover modified so that the eNB receiving the OVERLOAD START message shall assume that the MME from which it receives the message is being in, or running the risk of entering an overloaded state.

The eNB is moreover modified so that it shall:
if the Erroneous Traffic Indication IE is included in the OVERLOAD START message and, if supported, reduce the signalling traffic indicated as erroneous. The way of reducing the traffic indicated may be implementation specific e.g. by rejecting or ignoring messages.

According to an aspect of the invention, the Overload Start message, c.f. 9.1.8.13 is modified in the following manner (changes indicated by underlining):

The Erroneous Traffic Indication IE indicates that the traffic identified in the OVERLOAD START message IE shall be reduced.

| IE/Group Name | Presence | Range | IE type and reference | Semantics description |
|---|---|---|---|---|
| Erroneous Traffic Indication | M | | ENUMERATED (Erroneous Traffic, . . . ) | |

In 3GPP TS36.413 v. 14.0.0 8.7.7 Overload Stop is explained in 8.7.7.1—General.

The purpose of the Overload Stop procedure is to signal to an eNB the MME is connected to that the overload situation at the MME has ended and normal operation shall resume.

According to an embodiment of the invention—if the GUMMEI List IE is present—the eNB shall, if supported, use this information to identify which traffic to cease rejecting or reducing, and proceed according to TS 36.300, clauses 4.6.2, 4.7.4 and 19.2.2.12. If no particular overload action is ongoing for a particular GUMMEI value, the eNB shall ignore this value.

According to aspects of the invention, it is noted that the sooner the network can detect that misbehaving devices shall be refused access, the less resources are wasted and the less is the risk of getting congestion in the network. By informing radio network about identities of misbehaving devices the radio base stations can take appropriate actions such as refusing or ignoring affected devices with minimum network effort.

In principle this could be done on an individual UE basis (i.e. providing to eNB the identity of each misbehaving UE). However, using individual UE identities does not seem as a feasible solution as potentially a lot of identities need to be handled by several eNBs.

Hence, according to an aspect of the invention, the misbehaving UEs are identified as a group, that is, first providing to the eNB with information concerning the identity of the group for which traffic is to be reduced and subsequently assigning this group identity to each misbehaving UE. According to an aspect, UEs which are determined as misbehaving are assigned to a GUMMEI including a specific MMEC value reserved for traffic limitation purposes. The MMEC value then needs, per PLMN, to be made known to both the RAN and the CN.

At connection request from a UE using an S-TMSI including the specific MMEC value, the eNB would take proper action i.e. rejecting or ignoring the request.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Overload Response | M | | 9.2.3.19 | | YES | reject |
| GUMMEI List | | 0 . . . 1 | | | YES | ignore |
| >GUMMEI List Item | | 1 . . . <maxnoof-MMECs> | | | EACH | ignore |
| >>GUMMEI | M | | 9.2.3.9 | | — | |
| Traffic Load Reduction Indication | O | | 9.2.3.36 | | YES | ignore |
| Erroneous Traffic Indication | O | | 9.2.3.x | | YES | ignore |

Hence, in one embodiment the existing OVERLOAD START message is extended by addition of a new parameter. The eNB receiving an OVERLOAD START message including this parameter will be informed that any UE request including the MMEC indicated in the OVERLOAD START can be seen as invalid.

In one embodiment, the existing OVERLOAD START handling is such that traffic identified with the existing mechanism is valid but the amount of this traffic needs to be reduced. The new handling indicates to the eNB that all traffic as identified by the indicated MMEC is invalid. A new optional parameter is introduced in the OVERLOAD START message to indicate to the eNB which traffic should be reduced. The way of carrying out the traffic reduction may be implemented in various ways. The optional Traffic Load Reduction Indication shall not be used together with the new parameter as all traffic of the type indicated by the new parameter shall be reduced.

A further embodiment may be applicable to CN overload control for data transfer via Control Plane Cellular Internet of Things, CIoT Evolved Packet System EPS Optimisation. For devices that are permanently misbehaving e.g. devices infected by Distributed Denial of Service (DDOS) malicious virus, this solution involves that the MME respond to an attach request with a GUTI that includes a specific MMEC that is known in eNBs to be blocked. This is especially important for misbehaving devices using the Control Plane Cellular Internet of Things, CIoT, Optimization e.g. sending frequent data. By using the existing Overload Start/Stop mechanism the eNBs is provided with a GUMMEI including the aforementioned MMEC and an indication to block signalling and data over CP that includes the MMEC.

In FIG. 8 such an embodiment is shown, wherein a UE with a "Blocked" MMEC during the UE Attach or TAU procedures.

In step 101 the UE initiates Attach or TAU Request with preferred network behaviour for Control Plane CIoT Optimisation.

In step 102, if the MME knows or decides that the UE is misbehaving and needs to be blocked.

In step 103 the MME returns within the Attach/TAU Accept message a GUTI including a MMEC which is previously provided to the RAN to be blocked at any access request.

Figure 9:
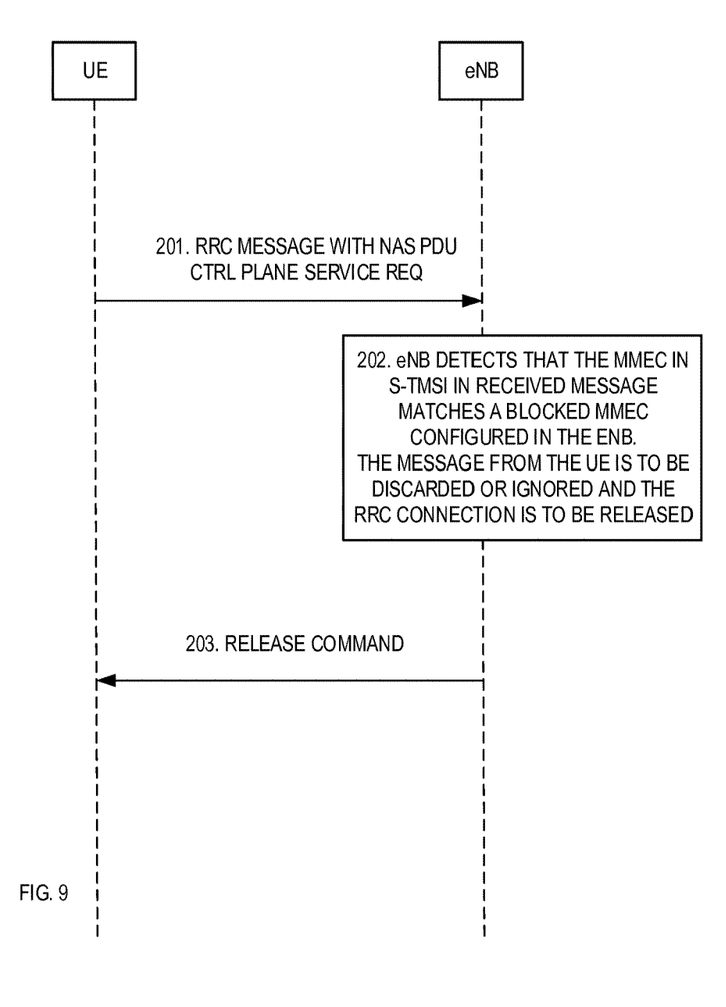

In FIG. 9, a further embodiment is indicated showing a Blocked MMEC during Control Plane Service Request.

In step 201 the UE initiates Control Plane Service Request from Idle Mode in order to transmit data via Control Plane CIoT EPS Optimisation. A Radio Resource Control, RRC message with NAS PDU (Network Access Stratum) Control Plane Service Request is set from the UE to the eNB.

In step 202, the eNB detects that the MMEC in the S-TMSI in the received message matches a blocked MMEC configured in the eNB and determines that the message from the UE is to be discarded or ignored and the RRC connection is to be released.

In step 203, The RRC connection is released.

According to embodiments of the invention, an efficient tool for operators to disable misbehaving devices has been provided. Misbehaving devices can thereby be blocked in RAN and will not cause any further load in the network. The solution works for all devices regardless if they have implemented back-off features or not.

Figure 10:
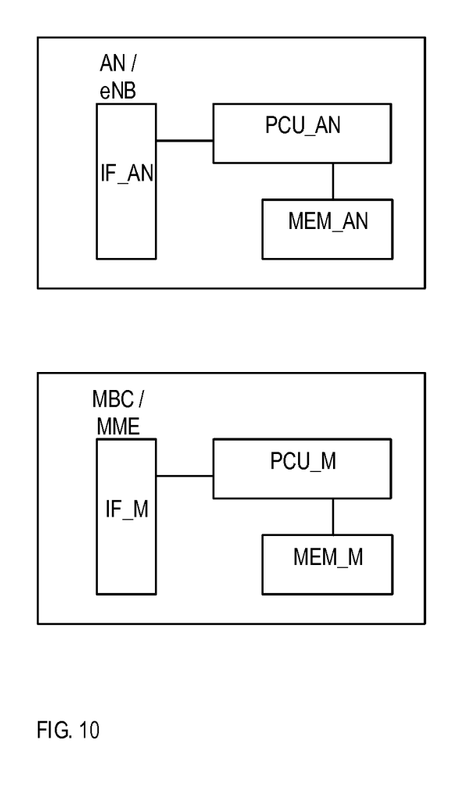
FIG. 10 shows embodiments of an access node, AN such as a eNodeB', eNB, and a Mobile Management Entity MME/Mobility Control Entity, MBC.

In FIG. 10, there is shown a AN/eNB comprising processing means comprising a processor PCU_AN, an interface IF_AN; and a memory, MEM_AN. Instructions are stored in the memory for being performed by the processor such that the method steps explained above are carried out and signalling is communicated on the interface.

Finally, a MBC/MME comprising processing means comprising a processor PCU_MBC an interface IF_MBC; and a memory, MEM_MBC. Instructions are stored in the memory for being performed by the processor such that the method steps explained above are carried out and such that corresponding signalling is effectuated on the interface.

According to embodiments of the invention there is provided, a method for a mobile management control entity, MBC, being adapted for communicating with an access node, AN, such as an eNodeB, the MB being adapted for, —issuing a message 6 comprising an indication 7 of a type of traffic to be reduced to or from the AN, wherein the traffic reduction 212 comprises one of blocking, rejecting, ignoring or selectively restricting traffic.

The message 6 comprising the indication 7 of a type of traffic to be reduced may be an overload message 6 that indicates a started overload situation, or overload situation that is risking to start, the message 6 being transmitted to the AN. Moreover, the overload message 6 may comprise an erroneous traffic indication.

According to one aspect of the invention, the indication 7 of a type of traffic to be reduced is associated with a reserved identity space to which UEs may be assigned.

According to another aspect the MBC is a Mobility Management Entity, MME, the access node, AN, is an eNodeB, and wherein the reserved identity space is a Globally Unique Mobile Management Entity Identifier, GUMMEI, list in-formation element comprising a list of MME Code, MMEC, identities reserved for being assigned to UE's being subject to traffic reduction.

The list of MMEC identities reserved for being assigned to UE's being subject to traffic reduction may advantageously be chosen so as not to correspond to any MME's being used at a given time in a Public Land Mobile Network, PLMN.

The MBC after having issued the message 6 comprising the indication 7 of type of traffic to be reduced, may be—performing a determination 140 as to reduce traffic for a UE, such as for a particular UE that is misbehaving; —assigning 142 the UE to an identity within the reserved identity space associated with the type of traffic to be reduced; and —transmitting a further message 150 with the assigned UE to the AN.

The further message 150 can be an attach accept message 151, 103, Traffic Area Update, TAU, accept message or Globally Unique Temporary ID, GUTI, reallocation command.

The UE may be assigned to a Globally Unique Temporary ID, GUTI, in which the MMEC is chosen from the reserved ad-dress space.

According to one embodiment, the overload message 6, 7 is an Overload Start message.

Provided is also an access node, AN, such as eNodeB, eNB, the AN being adapted for radio access to UE's the AN communicating with a mobility control entity, MBC such as a Mobility Management Entity, MME, the AN being adapted for—receiving from the MBC a message 6 with an indication 7 of a type of traffic to be reduced from the MBC; —receiving 151, 150 a message indicating a UE associated with the indication of a type of traffic to be reduced; and—blocking, rejecting, ignoring or selectively restricting 212 traffic to or from the UE belonging to the indication of type of traffic to be reduced.

The indication 7 of a type of traffic to be reduced is associated with a re-served identity space to which UEs may be assigned;

and the AN being further adapted for—forwarding 210 the further message 150 with an assigned UE to the AN, wherein the further message 150 comprises—an assigning 142 of the UE to an identity within the reserved identity space associated with the type of traffic to be reduced, —receiving an attach request 22 from a UE.

The UE may be assigned to a Globally Unique Temporary ID, GUTI, in which a MMEC is chosen from a reserved an ad-dress space associated with the indication of a type of traffic to be reduced and wherein the further message 150 is an attach accept message 151, 103 Traffic Area Update, TAU, accept message or Globally Unique Temporary ID, GUTI, reallocation command.

The methods described above may be implemented as a computer program or computer program product According to a further embodiment there is provided a mobile management control entity, MBC, being adapted for communicating with an access node, AN, such as an eNodeB, the MBC comprising processing means being adapted for, issuing a message comprising an indication 7 of a type of traffic to be reduced to or from the AN, wherein the traffic reduction comprises one of blocking, rejecting, ignoring or selectively restricting traffic.

The processing means may be constituted by a processor PCU_MBC an interface IF_MBC and a memory, MEM_MBC, wherein instructions are stored in the memory for being performed by the processor and such that signalling is effectuated on the interface.

According to a further embodiment there is provided an access node, AN, such as eNodeB, eNB, the AN comprising processing means being adapted for radio access to UE's the AN communicating with a mobility control entity, MBC, the AN being adapted for receiving from the MBC a message 6 with an indication 7 of a type of traffic to be reduced, receiving 150 a further message 150 indicating a UE associated with the indication of a type of traffic to be reduced from the MBC, blocking, rejecting, ignoring or selectively restricting 212 traffic to or from the UE belonging to the indication of type of traffic to be reduced.

The processing means may be constituted by a processor PCU_AN, an interface IF_AN and a memory MEM_AN for holding instructions for being performed by the processor and such that signalling is effectuated on the interface.

Figure 11:
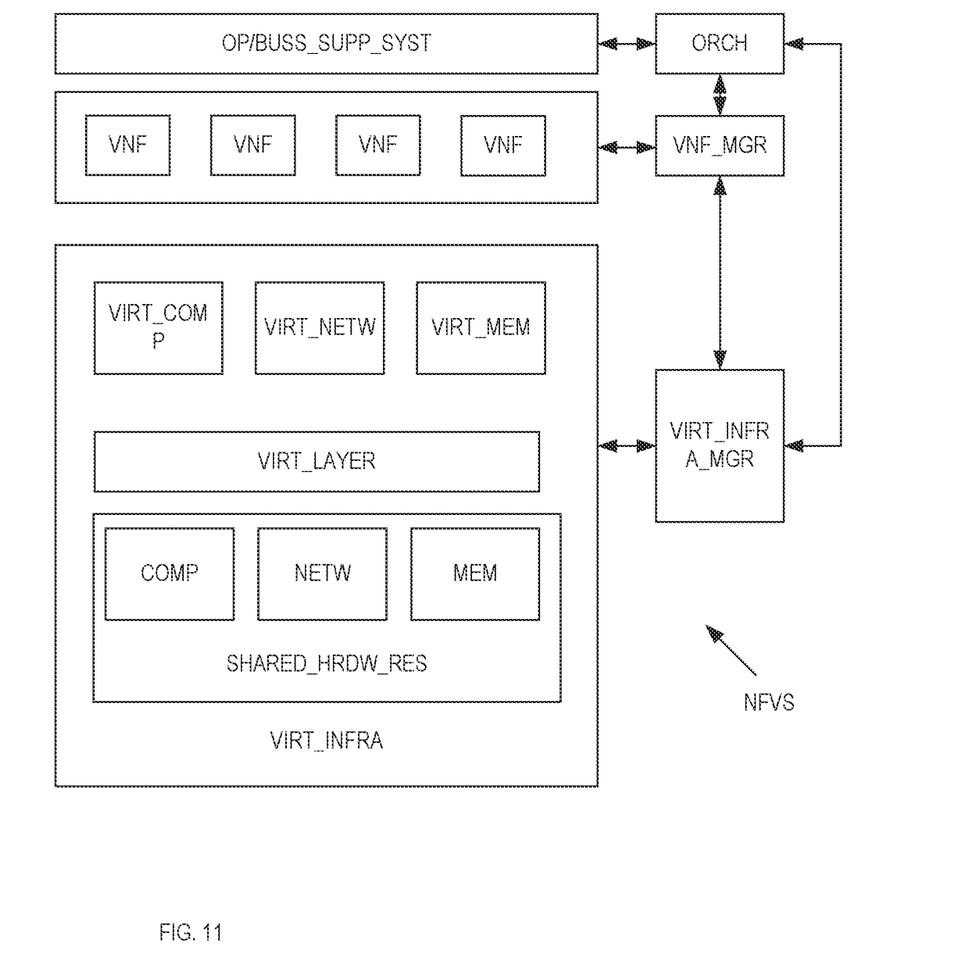
FIG. 11 shows alternative implementations of the above nodes.

The methods discussed above may alternatively be implemented by means of a system based on network functions virtualization. In FIG. 11, further embodiments of the invention are implemented by means of such a network function virtualization system, NFVS, formed on e.g. general purpose servers, standard storage and switches. The NFVS may be arranged along the lines described in FIG. 4, ETSI GS NFV 002 V. 1.1.1 (2013-10) and comprises the following elements: A NFV management and orchestration system comprising an Orchestrator, ORCH, a VNF manager, VNF_MGR, and a virtualised Infrastructure manager, VIRT_INFRA_MGR. The NFVS moreover comprises an operational/business support system, OP/BUSS_SUPP_SYST; a number of virtual network function instances, VNF, by which the method steps explained above are instantiated; and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, NETW, comprising e.g. standard switches and other network devices, and standard data storage devices, MEM.

The invention claimed is:

1. A method of operating a mobile management control entity (MBC) that is adapted for communicating with an Access Node (AN), the method comprising the MBC:

transmitting an overload message indicative of a started overload situation or overload situation that is risking to start, the overload message comprising:

a Traffic Load Reduction Indication Information Element (IE) identifying a requested percentage of a type of traffic to be reduced; and/or an erroneous traffic indication Information Element (IE) identifying a type of traffic to be reduced to or from the AN;

wherein the traffic reduction comprises blocking, rejecting, ignoring, or selectively restricting traffic;

wherein the erroneous traffic indication IE is associated with a reserved identity space to which User Equipments (UEs) may be assigned; and wherein the reserved identity space is a Globally Unique Mobile Management Entity Identifier (GUMMEI) list information element comprising a list of identities reserved for being assigned to UE's being subject to traffic reduction.

2. The method of claim 1:

wherein the MBC is a Mobility Management Entity (MME); and wherein AN is an eNodeB wherein the Globally Unique Mobile Management Entity Identifier (GUMMEI) list information element comprises a list of MME Code (MMEC) identities.

3. The method of claim 2, wherein the list of MMEC identities reserved for being assigned to UE's being subject to traffic reduction are chosen so as not to correspond to any MME's being used at a given time in a Public Land Mobile Network.

4. The method of claim 2, wherein a UE is assigned to a Globally Unique Temporary ID (GUTI) in which the MMEC is chosen from a reserved address space.

5. The method of claim 2 wherein the overload message is an Overload Start message.

6. The method of claim 1, further comprising, the MBC, after having transmitted the overload message comprising the indication of the type of traffic to be reduced:

performing a determination as to reduce traffic for a User Equipment (UE);

assigning the UE to an identity within the reserved identity space associated with the type of traffic to be reduced;

transmitting a further message with the assigned identity of the UE to the AN.

7. The method of claim 6, wherein the further message is an attach accept message, Traffic Area Update (TAU) accept message, or Globally Unique Temporary ID (GUTI) reallocation command.

8. A method of operating an Access Node (AN) that is adapted for radio access to User Equipments (UEs), wherein the AN communicates with a mobility control entity (MBC), the method comprising:

receiving, from the MBC, an overload message indicative of a started overload situation or overload situation that is risking to start, the overload message comprising:

a Traffic Load Reduction Indication Information Element (IE) identifying a requested percentage of a type of traffic to be reduced; and/or an erroneous traffic indication Information Element (IE) identifying a type of traffic to be reduced to or from the AN;

receiving, from the MBC, a further message indicating a UE associated with the indication of the type of traffic to be reduced;

blocking, rejecting, ignoring, or selectively restricting traffic to or from the UE belonging to the indication of the type of traffic to be reduced;

wherein the erroneous traffic indication IE is associated with a reserved identity space to which User Equipments (UEs) may be assigned; and wherein the reserved identity space is a Globally Unique Mobile Management Entity Identifier (GUMMEI) list information element comprising a list of identities reserved for being assigned to UE's being subject to traffic reduction.

9. The method of claim 8:

wherein the further message comprises an assigning of the UE to an identity within the reserved identity space associated with the type of traffic to be reduced; and wherein the method further comprises receiving an attach request from a UE.

10. The method of claim 8:

wherein the UE is assigned to a Globally Unique Temporary ID (GUTI) in which a MME Code (MMEC) is chosen from a reserved address space associated with the indication of the type of traffic to be reduced; and wherein the further message is an attach accept message, a Traffic Area Update (TAU) accept message, or a Globally Unique Temporary ID (GUTI) reallocation command.

11. A mobile management control entity (MBC) adapted for communicating with an Access Node (AN), the MBC comprising:

processing circuitry;

memory containing instructions executable by the processing circuitry whereby the MBC is operative to:

transmit an overload message indicative of a started overload situation or overload situation that is risking to start, the overload message comprising:

a Traffic Load Reduction Indication Information Element (IE) identifying a requested percentage of a type of traffic to be reduced; and/or an erroneous traffic indication Information Element (IE) identifying a type of traffic to be reduced to or from the AN;

wherein the traffic reduction comprises blocking, rejecting, ignoring, or selectively restricting traffic;

wherein the erroneous traffic indication IE is associated with a reserved identity space to which User Equipments (UEs) may be assigned; and wherein the reserved identity space is a Globally Unique Mobile Management Entity Identifier (GUMMEI) list information element comprising a list of identities reserved for being assigned to UE's being subject to traffic reduction.

12. The MBC of claim 11: wherein the MBC is a Mobility Management Entity (MME); and wherein the AN is an eNodeB; wherein the Globally Unique Mobile Management Entity Identifier (GUMMEI) list information element comprising a list of MME Code (MMEC) identities.

13. The MBC of claim 12, wherein the list of MMEC identities reserved for being assigned to UE's being subject to traffic reduction are chosen so as not to correspond to any MME's being used at a given time in a Public Land Mobile Network.

14. The MBC of claim 12, wherein the UE is assigned to a Globally Unique Temporary ID, GUTI, in which the MMEC is chosen from a reserved address space.

15. The MBC of claim 11, wherein the instructions are such the MBC is operative to, after having transmitted the overload message comprising the indication of the type of traffic to be reduced:

perform a determination as to reduce traffic for a UE;

assign the UE to an identity within the reserved identity space associated with the type of traffic to be reduced; and transmit a further message with the assigned identity of the UE to the AN.

16. The MBC of claim 15, wherein the further message is an attach accept message, a Traffic Area Update (TAU) accept message, or Globally Unique Temporary ID (GUTI) reallocation command.

17. The MBC of claim 11, wherein the overload message is an Overload Start message.

18. An Access Node (AN) adapted for radio access to User Equipments (UEs) and for communicating with a mobility control entity (MBC), the AN comprising:

processing circuitry;

memory containing instructions executable by the processing circuitry whereby the AN is operative to:

receive, from the MBC, an overload message indicative of a started overload situation or overload situation that is risking to start, the overload message comprising:

a Traffic Load Reduction Indication Information Element (IE) identifying a requested percentage of a type of traffic to be reduced; and/or an erroneous traffic indication Information Element (IE) identifying a type of traffic to be reduced to or from the AN;

receive, from the MBC, a further message indicating a UE associated with the indication of the type of traffic to be reduced;

block, reject, ignore, or selectively restrict traffic to or from the UE belonging to the indication of the type of traffic to be reduced;

wherein the erroneous traffic indication IE is associated with a reserved identity space to which User Equipments (UEs) may be assigned; and wherein the reserved identity space is a Globally Unique Mobile Management Entity Identifier (GUMMEI) list information element comprising a list of identities reserved for being assigned to UE's being subject to traffic reduction.

19. The AN of claim 18:

wherein the further message comprises an assigning of the UE to an identity within the reserved identity space associated with the type of traffic to be reduced; and wherein the instructions are such the AN is operative to receive an attach request from a UE.

20. The AN of claim 18:

wherein the UE is assigned to a Globally Unique Temporary ID (GUTI) in which a Mobility Management Entity Code (MMEC) is chosen from a reserved address space associated with the indication of the type of traffic to be reduced; and wherein the further message is an attach accept message, Traffic Area Update (TAU) accept message, or Globally Unique Temporary ID (GUTI) reallocation command.

* * * * *